UNITED STATES PATENT OFFICE.

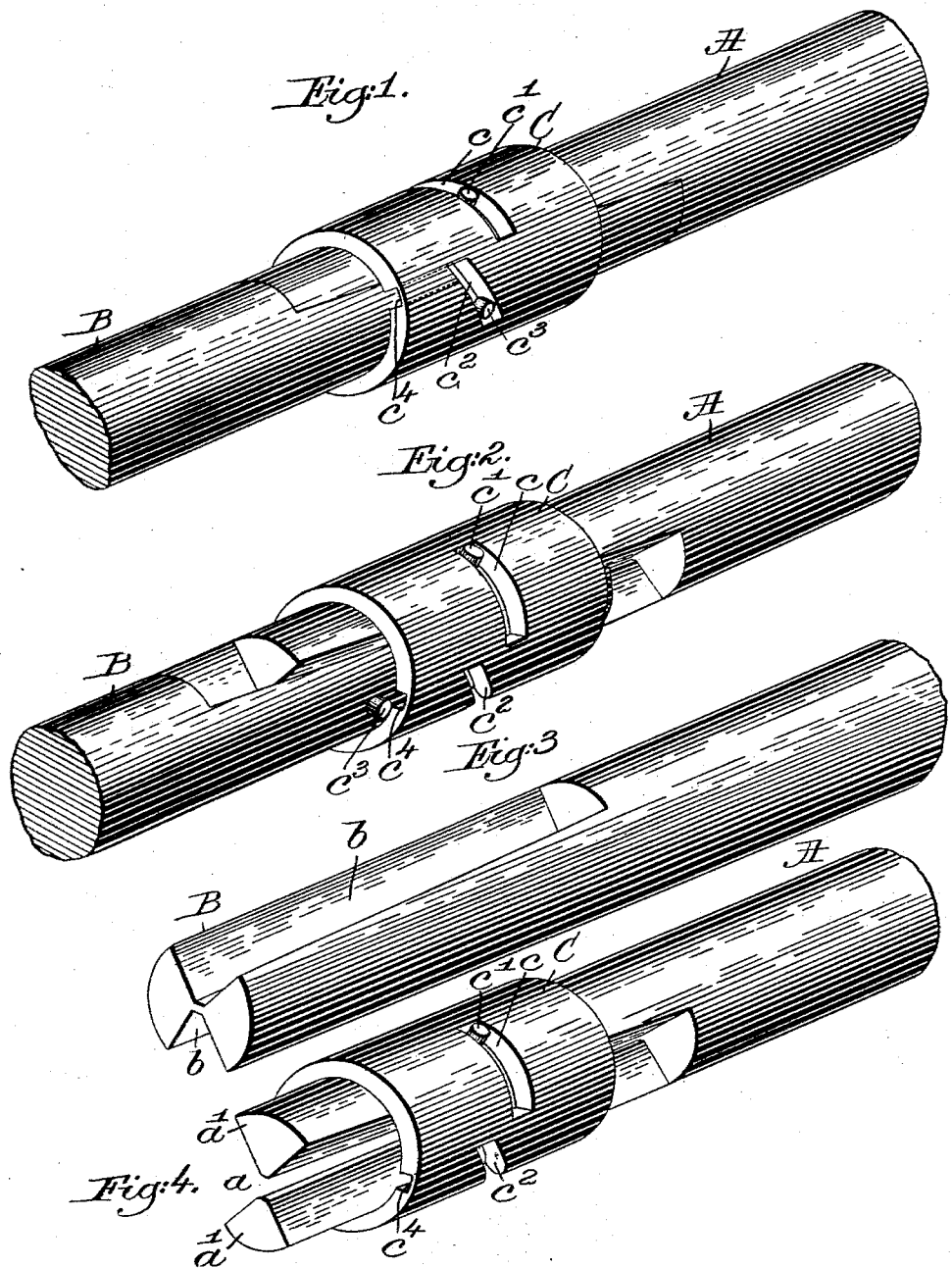

HERBERT L. FLINT, OF CAMBRIDGE, MASSACHUSETTS.

COUPLING.

SPECIFICATION forming part of Letters Patent No. 589,708, dated September 7, 1897.

Application filed November 16, 1896. Serial No. 612,208. (No model.)

*To all whom it may concern:*

Be it known that I, HERBERT L. FLINT, of Cambridge, county of Middlesex, State of Massachusetts, have invented an Improvement in Couplings, of which the following description, in connection with the accompanying drawings, is a specification, like letters on the drawings representing like parts.

This invention has for its object the production of a novel coupling device for shafts and other things to be joined end to end.

I have shown my invention as applied to joining two shafts, and the end of one is shown as slotted to present prongs which enter correspondingly-shaped grooves made in the end of the other shaft.

The particular shape in cross-section of the prongs or fingers and of the grooves to receive them may be variously modified without departing from my invention so long as the prongs or fingers substantially fit the said grooves.

The two ends of the shafts having been interlocked, the interlocked parts are held in engagement by means of a circular band or collar provided, preferably, with two slots, each of which is entered by a pin or projection, one from each of the shaft ends.

The collar may be carried permanently by one of said shaft ends and may be coupled with the other of said ends by means of a bayonet-slot and pin or projection.

Figure 1 shows two shaft ends united in accordance with my invention. Fig. 2 shows the same being put together, and Figs. 3 and 4 show the ends of the shafts prepared to be forked together.

The shaft end A is cut away at opposite points, as at $a\, a$, to form a plurality of prongs $a'\, a'$, and the shaft end B is cut away to form recesses, as $b$, for the reception of the prongs $a'$, where the two shaft ends are forked together.

The forked part A is herein shown as surrounded by a loose collar C, having a slot $c$, in which stands a pin or projection $c'$, extended from one of the prongs $a'$. This collar has a second slot $c^2$, which is entered by a pin or projection $c^3$, extended from the part B, and preferably said slot $c^2$ has an extension $c^4$, leading out to the end of the collar, so that when the shaft ends are being put together the pin or projection $c^3$ may enter the slot $c^4$, as in Fig. 2, and as the forked end is further closed, as in Fig. 1, the said pin or projection enters the inclined slot $c^2$, which effectually locks the parts A B together.

The plan herein described for uniting the two shaft ends may be employed to unite any two round ends in cross-section which are capable of being forked together, and by the term "shaft end" I intend to include and cover any ends of any articles to be joined detachably together.

The fingers and the grooves for their reception may, and preferably will, be tapered.

The slotted collar and the pins coöperating therewith constitute a locking device to prevent endwise movement or separation of said ends; but I may vary the construction of the locking device without departing from my invention, for I am not aware that a locking device of any kind has ever been combined with two forked ends to hold the same one in the other.

Having described my invention, what I claim, and desire to secure by Letters Patent, is—

1. Two ends A, B, slotted and grooved to enable them to be forked together, combined with a collar surrounding said forked ends, said collar having two slots, and each slot receiving a pin or stud from one of said ends, substantially as described.

2. The forked end A, the grooved end B, the loose collar having slots $c$, and $c^2\, c^4$, and a pin or projection to retain said collar on one of said ends, combined with a pin or projection on the other of said ends to enter said slot $c^4\, c^2$, substantially as described.

3. A coupling the members of which are grooved at their adjacent ends, one of said members being longitudinally slotted, to enable them to be forked together, combined with a collar rotatably connected with one member and to surround the said forked ends, and a detachable pin-and-slot connection between the collar and the other member, substantially as described.

In testimony whereof I have signed my name to this specification in the presence of two subscribing witnesses.

HERBERT L. FLINT.

Witnesses:
GEO. W. GREGORY,
EMMA J. BENNETT.